P. CHOVANECZ.
FOLDABLE VEHICLE FENDER.
APPLICATION FILED APR. 21, 1915.

1,142,490.

Patented June 8, 1915.
5 SHEETS—SHEET 3.

Inventor
P. Chovanecz

By A. M. Wilson
Attorney

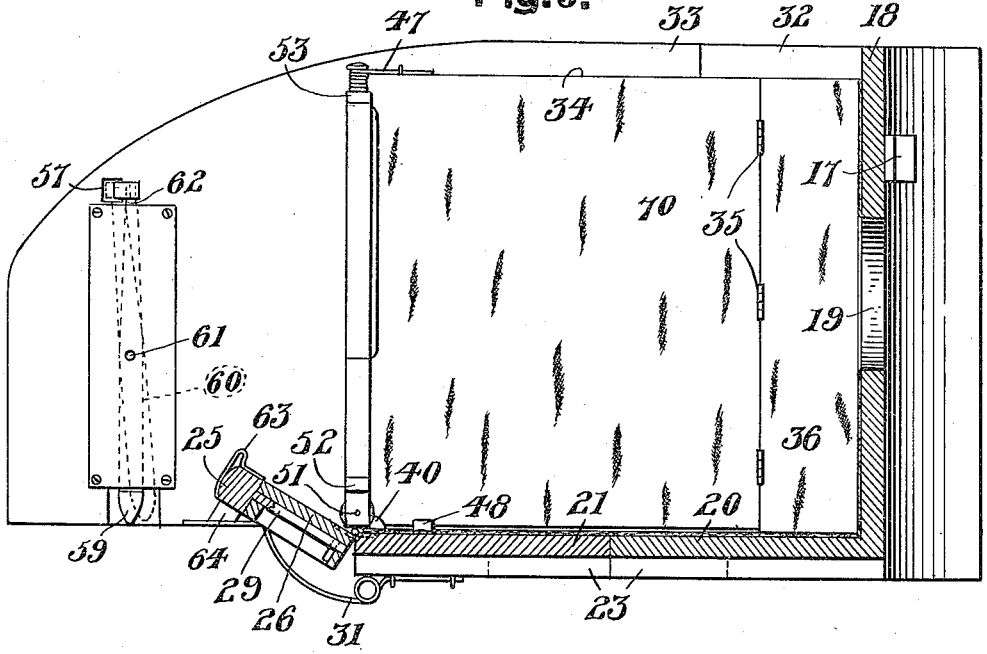
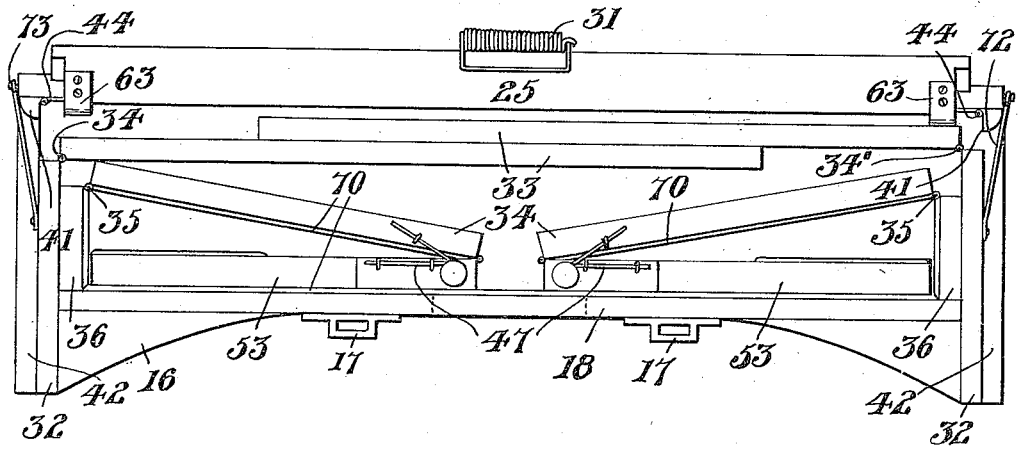

P. CHOVANECZ.
FOLDABLE VEHICLE FENDER.
APPLICATION FILED APR. 21, 1915.
1,142,490.
Patented June 8, 1915.
5 SHEETS—SHEET 5.
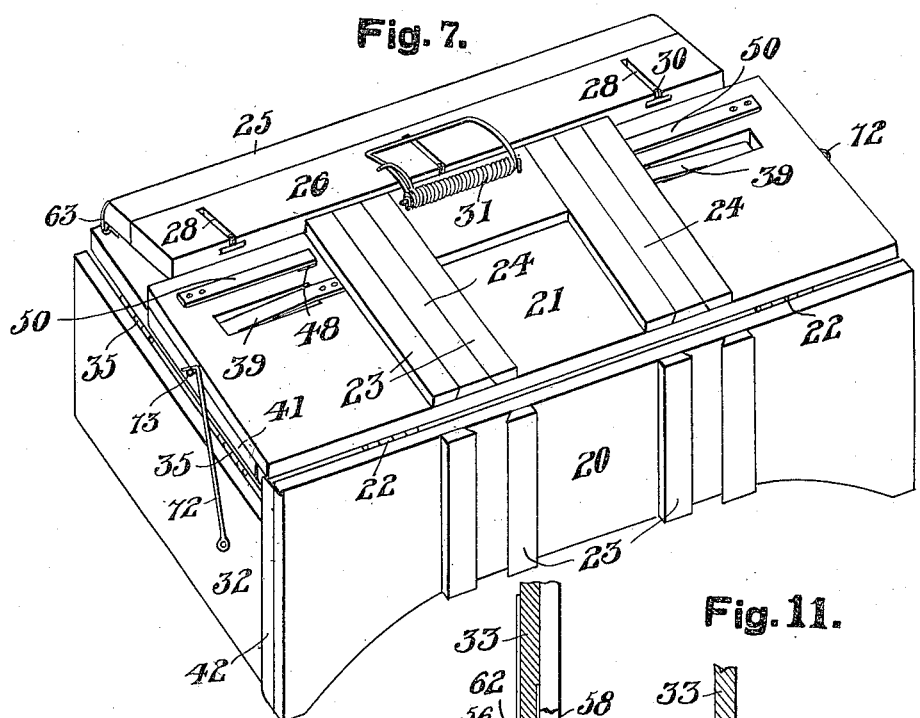
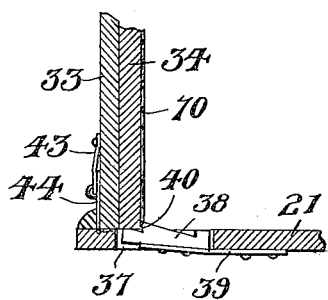
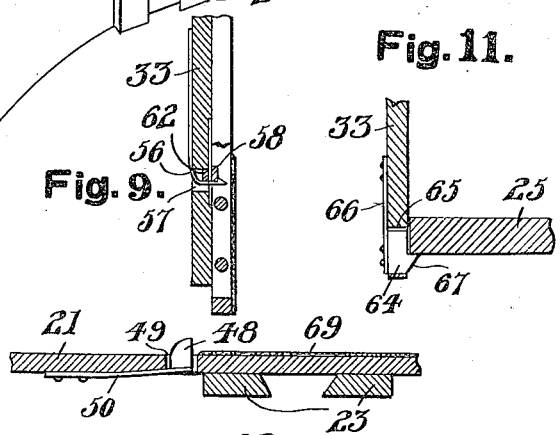
Inventor
P. Chovanecz
By N. M. Wilson
Attorney

UNITED STATES PATENT OFFICE.

PAUL CHOVANECZ, OF JOHNSTOWN, PENNSYLVANIA.

FOLDABLE VEHICLE-FENDER.

1,142,490. Specification of Letters Patent. Patented June 8, 1915.

Application filed April 21, 1915. Serial No. 22,857.

*To all whom it may concern:*

Be it known that I, PAUL CHOVANECZ, a citizen of the United States of America, residing at Johnstown, in the county of Cambria and State of Pennsylvania, have invented certain new and useful Improvements in Foldable Vehicle-Fenders, of which the following is a specification.

This invention relates to new and useful improvements in foldable vehicle fenders.

The primary object of the invention is the provision of a foldable fender adapted for such vehicles as street cars and automobiles, the same being capable of receiving and supporting any person or object encountered during the course of travel, but also arranged for being compactly folded when desired.

A further object of the invention is the provision of a vehicle fender having a closable inclosure adapted for automatically closing whenever the fender strikes an obstruction, the device then receiving and holding the same.

A still further object is to provide a foldable fender adapted for attachment to the forward portion of a vehicle, the fender having an inclosure with normally opened front doors adapted to receive a person who is struck by the fender and providing for the carrying reception of such person and the automatic closing of the said doors to inclose the person within the fender.

With these general objects in view and others that will appear as the nature of the invention is better understood, the same consists in the novel combination and arrangement of parts hereinafter fully described, illustrated in the accompanying drawings and pointed out in the appended claims.

Figure 1:
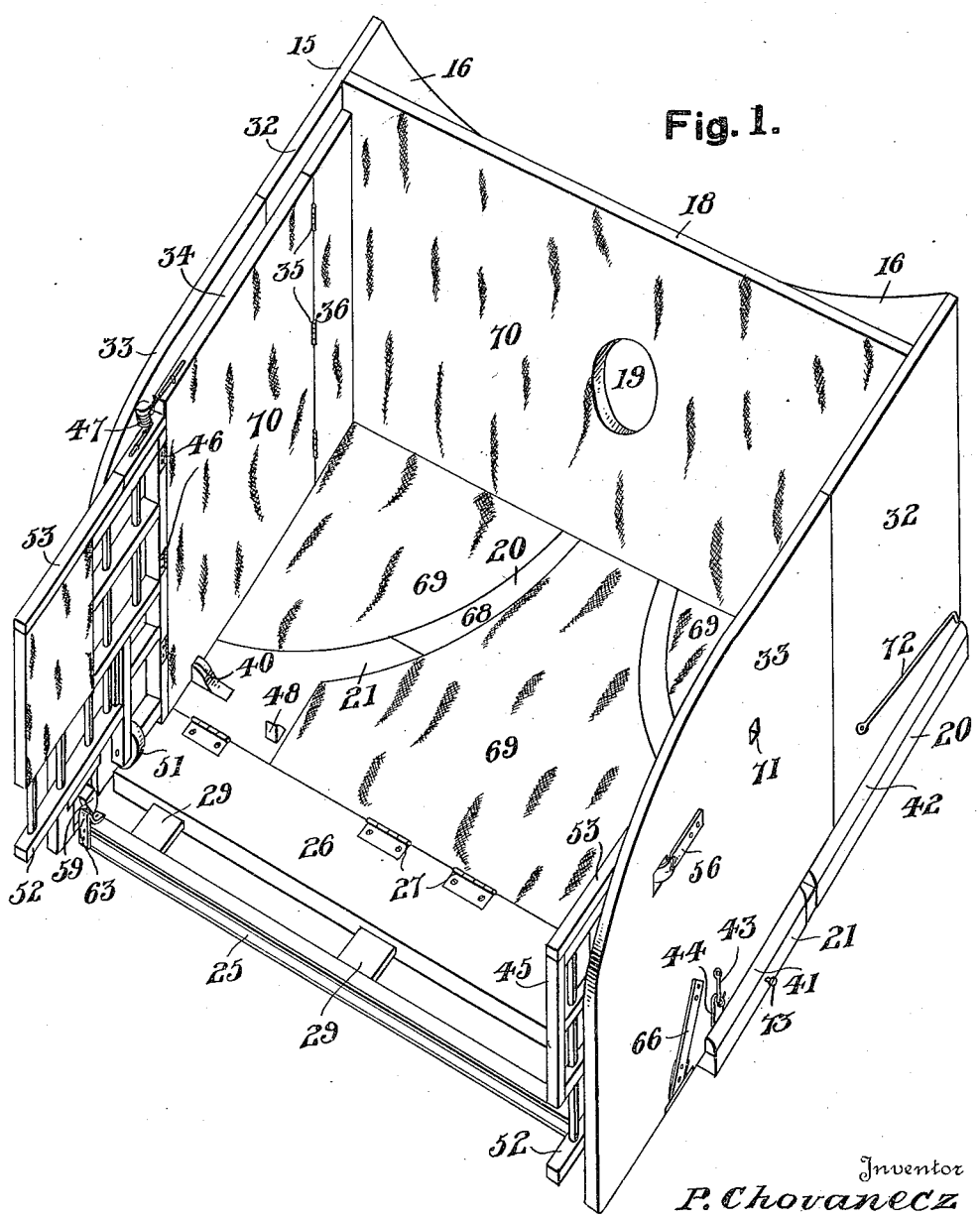
Figure 2:
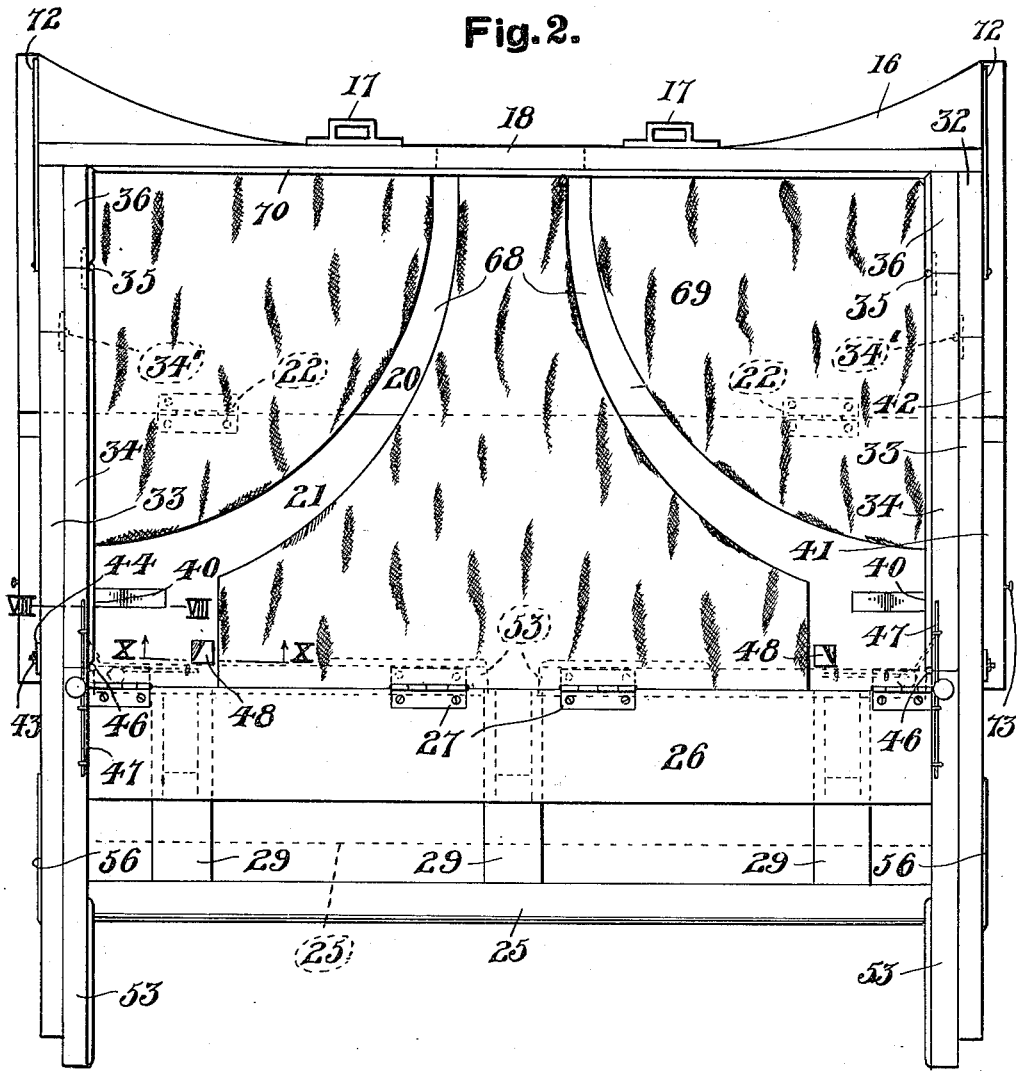
Figure 3:
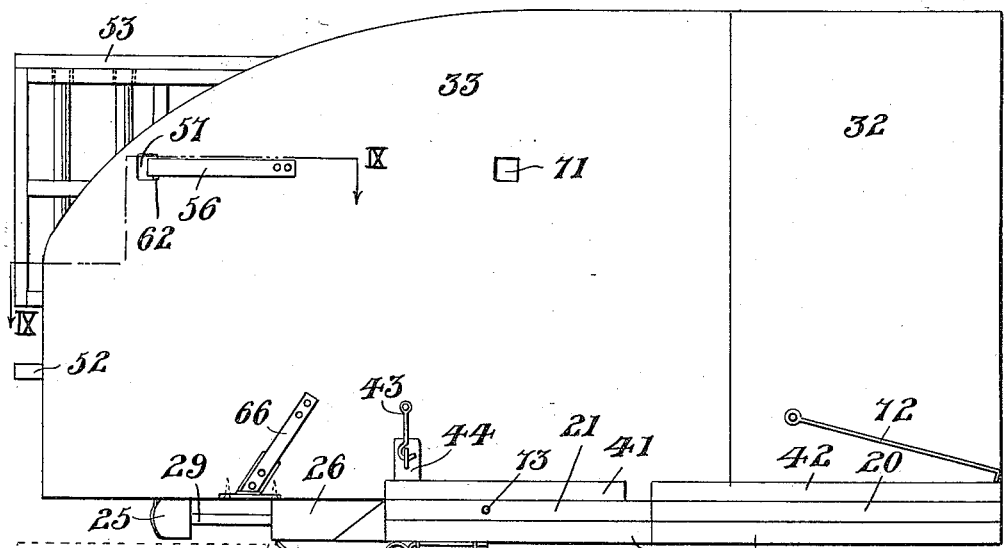
Figure 4:
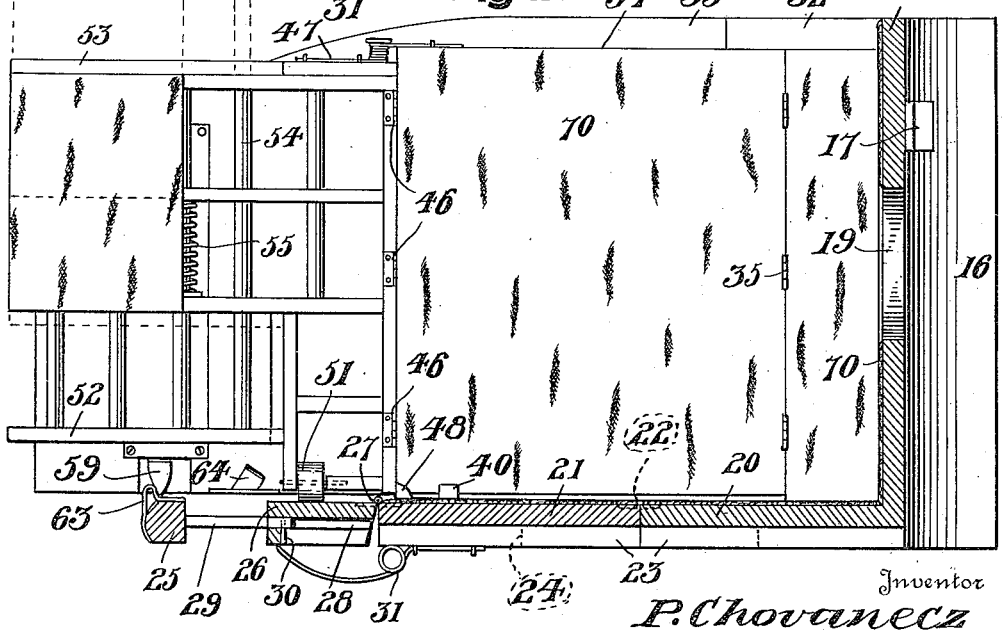

In the drawings forming a part of this application and in which like designating characters refer to corresponding parts throughout the several views:—Figure 1 is a perspective view of the device detached from the vehicle and illustrated in its open position. Fig. 2 is a top plan view thereof. Fig. 3 is a side elevation of the same. Fig. 4 is a central longitudinal section thereof. Fig. 5 is a sectional view similar to Fig. 4 but with the device in its inclosing position. Fig. 6 is a top plan view of the device completely folded for storage. Fig. 7 is a perspective view thereof. Fig. 8 is a detail sectional view taken upon line VIII—VIII of Fig. 2. Fig. 9 is a similar sectional view taken upon line IX—IX of Fig. 3. Fig. 10 is a similar section taken upon line X—X of Fig. 2, and Fig. 11 is a detail sectional view through one of the obliquely arranged spring hook members of the fender bottom.

It will be first understood that the device is for the purpose of attachment forwardly of a vehicle such as a street car and whereby any person upon the track will be prevented from being run over being caught in the present fender and carried safely along until the car can be stopped and the person released.

The device comprises a frame 15 having a curved rear face 16 for engaging the front face of the street car dash-board, the present fender being secured thereto by means of the bracket loops 17 carried by the rear wall 18 of the fender. A central opening 19 is provided in the frame wall 18 for allowing the accommodation of the street car head light, not shown. The said fender frame is provided with a short length bottom portion 20 having an extension bottom or leaf 21 hinged thereto by means of the hinges 22, which members 20 and 21 together form the main bottom for the fender. The lower outer sides of the bottom members 20 and 21 are provided with spaced guide-ways 23 arranged in alinement with each other and adapted for accommodating locking slides 24 for retaining the said bottom members in alinement, lying horizontally, when the device is unfolded, as best illustrated in Fig. 4.

A fender bar 25 is forwardly arranged with respect to the fender floor or bottom and is slidably mounted upon a forward leaf 26 hinged as at 27 to the front edge of the bottom section 21, the said leaf 26 having slide grooves 28 therein for the reception of slide strips 29 carried by the slide bar and having stop pins 30 for preventing the strips from being removed from the said grooves. A coil spring 31 is attached to the lower face of the bottom section 21 and bears against the leaf 26 for influencing the same toward its upper tilted position as shown in Fig. 5.

The rear frame wall 18 has forwardly extending short sides 32 while main side panels 33 are hinged thereto, as at 34', the said panels being inwardly foldable, the said frame sides 32 and panels 33 together forming the complete sides for the fender, as best illustrated in Fig. 1 of the drawings.

Inner side walls 34 are hinged as at 35 to cleats 36 carried by the inner faces of the frame sides 32, the side wall 34 being also foldable inwardly, it being noted that the cleats 36 are of less width than the frame sides 32 which positions the inner walls 34 inwardly of the side panels 33 when the device is folded. The bottom section 21 is provided with opposite slots 37 having double notched hooks 38 resiliently projected therein by means of leaf springs 39. When the side panels 33 and inner walls 34 are unfolded, the same flatly engage each other and the notches 40 of the hooks 38 spring into engagement with the inner faces of the walls 34 as best illustrated in Figs. 1 and 8 of the drawings. While the panels and inner walls are thus operatively positioned, the outer sides of the panels engage stop cleats 41 and 42 carried by the bottom sections 21 and 20 respectively and the same are further secured in position by engaging hooks 43 carried outwardly by the said panel and engaging plates 44 swingingly carried by the bottom section 21.

Inwardly swinging front doors 45 are hinged as at 46 to the forward edges of the inner walls 34 and are provided with springs 47 tending to close the said doors against resiliently mounted stops 48 which project through openings 49 in the bottom section 21 and are normally inwardly projected by means of the leaf springs 50. The doors 45 have bottom rollers 51 for riding upon the leaf 26 and the bottom sections 21 and 20 during the swinging movement of the doors. A section 52 is provided for each of the doors having a top bar 53 and pickets 54 which is vertically shiftable and is normally retained in its lowered position by means of coil springs 55. This section 52 may be forcibly elevated against the action of the springs 55, which latter will then automatically return the same to its normal lowered position.

Inwardly projecting resilient hooks 56 are carried by the side panels 33 and project through openings 57 therein, such hooks being adapted to engage keeper bars 58 carried by the adjacent door when the door is in its opened position. Latches 59 are carried by the panels 33 and project inwardly therefrom, the said latches having extended arms 60 pivoted as at 61 to the panel and having upper ends 62 engaging inwardly of the said hooks 56. It will thus be seen that a forward movement of one of the latches 59 tilts such member in a manner to force its upper end 62 against the engaged hook 57 and thereby disengaging the hook from the keeper 58 of the adjacent door 45.

The ends of the bar 25 have upwardly projecting cam brackets 63 which are in alinement with the latches 59, so that a rearward impulse upon the bar 25 will releasingly engage the latches 59 and allow the springs 47 to automatically close the swinging doors 45 to their closed positions abutting the stops 48 which will provide a four sided inclosure having a complete bottom formed of the bottom sections 20 and 21. When the fender bar 25 strikes an object upon the track such as a pedestrian, the said bar is forced inwardly, automatically releasing the doors 45 as above set forth, while the coil spring 31 then swings the leaf 26 upon its hinges 28 retaining the said doors closed, as best illustrated in Fig. 5.

Obliquely arranged hooks 64 are carried by the panels 33 and are normally projecting inwardly through panel openings 65 by means of leaf springs 66. The side faces of the hooks 64 are beveled, as at 67, for allowing the movement of the leaf 26 and bar 25 to assume its inclined position and in which position the bar 25 will be received over the hooks 64 thus retaining the leaf and bar in its inclined engaging position.

From this detailed description of the construction of the device, the operation of the same in automatically receiving and inclosing a person who is struck by the fender, will be at once apparent, the bar 25 coming in actual contact with the person being forced inwardly, thus releasing the doors which close while the bar and leaf also close to their inclined locking position, as best shown in Fig. 5.

It being understood that the complete fender is designed to be folded compactly for storing purposes, the operation of this feature of the invention will now be described. When the doors are in their closed engagement with the members 48, the members 48 may be forcibly depressed which will allow the springs 47 to flatly engage the doors against the inner faces of the inner walls 34 while a releasing of the hooks 40 from their engagement with the inner walls allows the inner walls to be folded inwardly toward the frame rear wall 18, which will flatly engage the doors against the said rear wall in their folded positions, as best illustrated in Fig. 6. It will be seen that during the closing operation of the doors, the same move upon the rollers 51 while the inward folding of the walls 34 allows the said rollers 51 to travel upon the curved interrupted portions 68 in the padding 69 of the fender bottom, it being understood that the inner walls and end wall are lined with a similar packing or upholstery 70. The locking hooks and plates 43 and 44 respectively may then release the side panels 33 which may be moved inwardly upon their hinges 34 one in advance of the other in overlapping engagement and overlying the said folded doors and side walls as best shown in Fig. 6. It is to be noted that the bar 25 and leaf 26 are slightly moved upon their hinges 27 for allowing the closing of the side panels and that the hooks 40 and stops 48 must likewise be depressed which then allows the panels 33 to inwardly fold above the floor sections and leaf. The outer face of the underlying panel is provided with a recess 71 for accommodating the free end of the hook 56 carried by the overlying panel. The bottom section 23 is then moved upon its hinges 22 for overlying the folded panels when the entire device is retained in its closed position by means of hooks 72 carried by the frame sides 32 and engaging projecting pins 73 upon the opposite edges of the bottom section 21 as best illustrated in Fig. 7. The sliding members 24 are moved to their unlocked positions for allowing the hinging movement between the two bottom sections. An unfolding of the fender may be easily effected by releasing the hooks 72 and reversing the folding operation.

While the form of the invention herein shown and described is what is believed to be the preferred embodiment thereof, it is nevertheless to be understood that minor changes may be made in the form, proportion and details of construction without departing from the spirit and scope of the invention as set forth in the appended claims.

What I claim as new is:—

1. A vehicle fender comprising a mounting frame, hingedly connected inner walls and doors hinged to the said frame, hingedly connected bottom sections attached to the said frame, a shiftable fender bar forwardly carried by the said bottom and inwardly swinging side panels hinged to the said frame.

2. A fender comprising a frame having a rear wall, opposite sides and a bottom section, inner walls hingedly connected to the said side walls, and resiliently and hingedly connected inwardly swinging doors carried by the said walls.

3. A fender comprising a frame having a rear wall, opposite sides and a bottom section, inner walls hingedly connected to the said side walls, resiliently and hingedly connected inwardly swinging doors carried by the said walls, a forward bottom section hinged to the said frame bottom, adjustable locking cleats slidably positioned between the said bottom sections, opposite resiliently mounted hooks carried by the forward bottom section positioned inwardly of the normal unfolded position of the said walls, and resilient stops for the said doors carried adjacent the front edge of the said forward bottom section.

4. A fender comprising a frame having a rear wall, opposite sides and a bottom section, inner walls hingedly connected to the said side walls, resiliently and hingedly connected inwardly swinging doors carried by the said walls, a forward bottom section hinged to the said frame bottom, adjustable locking cleats slidably positioned between the said bottom sections, opposite resiliently mounted hooks carried by the forward bottom section positioned inwardly of the normal unfolded position of the said walls, resilient stops for the said doors carried adjacent the front edge of the said forward bottom section, a forward leaf hinged to said forward bottom section, resilient positioning means between the said leaf and forward section, a forwardly arranged fender bar slidably connected to the said leaf, engaging rollers carried by the bottoms of the said doors, and automatic tripping connecting means between the said doors and fender bar.

5. A fender comprising a frame having a rear wall, opposite sides and a bottom section, inner walls hingedly connected to the said side walls, resiliently and hingedly connected inwardly swinging doors carried by the said walls, a forward bottom section hinged to the said frame bottom, adjustable locking cleats slidably positioned between the said bottom sections, opposite resiliently mounted hooks carried by the forward bottom section positioned inwardly of the normal unfolded position of the said walls, resilient stops for the said doors carried adjacent the front edge of the said forward bottom section, a forward leaf hinged to said forward bottom section, resilient positioning means between the said leaf and forward section, a forwardly arranged fender bar slidably connected to the said leaf, engaging rollers carried by the bottoms of the said doors, inwardly swinging panels hinged to the said frame sides, resiliently mounted catch members for said fender bar arranged upon the said panels, engaging cam frames at the ends of the said fender bar, spring retaining catches for the said doors carried by the said panels, and catches having releasing arms in engagement with the said door hooks mounted upon the said panels and being operatively arranged in the path of travel of the said bar cam frames.

6. A fender comprising a frame having a bottom, inwardly foldable inner walls hinged to the said frame, resiliently inwardly foldable doors hinged to the said inner walls and adapted for positioning within the said frame, foldable overlapping side panels hinged to the said frame and adapted for overlying said inner walls, a bottom section hinged to the said fender bottom, and a shiftable forwardly positioned engaging means hinged to the said bottom section, the said bottom section and forward member adapted to overlie the said panels when the device is in its folded position.

7. A fender comprising a bottom, rear and side walls, front doors hinged to the said walls, retaining latches carried by the said walls adapted for engaging the said doors when the doors are in their opened position, a shiftable forwardly arranged fender bar carried by the said bottom, and automatic releasing means for the said doors in operative engagement with the said fender bar.

8. A fender comprising a bottom, rear and side walls, front doors hinged to the said walls, retaining latches carried by the said walls adapted for engaging the said doors when the doors are in their opened position, a shiftable forwardly arranged fender bar carried by the said bottom, automatic releasing means for the said doors in operative engagement with the said fender bar, a resilient stop for the said doors carried by the said bottom, padding interiorly arranged upon the said frame, and resiliently positioned shiftable sections carried by the said doors.

In testimony whereof I affix my signature.

PAUL CHOVANECZ.

Copies of this patent may be obtained for five cents each, by addressing the "Commissioner of Patents, Washington, D. C."